(12) United States Patent
Bendapudi et al.

(10) Patent No.: US 7,577,962 B2
(45) Date of Patent: Aug. 18, 2009

(54) ROUTING EXCEPTIONS TO OPERATING SYSTEM SUBSYSTEMS

(75) Inventors: Perraju Bendapudi, Hyderabad (IN); Rajesh Jalan, Hyderabad (IN); Vijay Kota, Secunderabad (IN); Siddharth Rana, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/004,585

(22) Filed: Dec. 3, 2004

(65) Prior Publication Data

US 2006/0150198 A1 Jul. 6, 2006

(51) Int. Cl.
*G06F 3/00* (2006.01)
*G06F 9/44* (2006.01)
*G06F 9/46* (2006.01)
*G06F 13/00* (2006.01)
*G06F 9/00* (2006.01)
*G06F 7/38* (2006.01)
*G06F 11/00* (2006.01)

(52) U.S. Cl. .................. 719/318; 712/244; 714/100

(58) Field of Classification Search .............. 719/318, 719/328; 712/244; 710/100, 260–269; 714/34, 714/100
See application file for complete search history.

(56) References Cited

U.S. PATENT DOCUMENTS 6,260,077 B1 * 7/2001 Rangarajan et al. ......... 719/328

OTHER PUBLICATIONS

"POSIX Compatibility", Microsoft TechNet, pp. 1-6.*
"Running Nonnative Applications in Windows 2000 Professional", Microsoft TechNet, pp. 1-2.*

* cited by examiner

*Primary Examiner*—Hyung S Sough
*Assistant Examiner*—Qing-Yuan Wu
(74) *Attorney, Agent, or Firm*—Perkins Coie LLP

(57) ABSTRACT

Techniques for routing exceptions to operating system subsystems are provided. In various embodiments, a software developer may add a global exception handler software component to an application. The global exception handler may operate in a process relating to a subsystem. Upon receiving an exception, the global exception handler may route the exception to another subsystem.

15 Claims, 6 Drawing Sheets

ROUTING EXCEPTIONS TO OPERATING SYSTEM SUBSYSTEMS

TECHNICAL FIELD

The described technology relates generally to operating systems and, more particularly, to routing exceptions to operating system subsystems.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may provide functionality to application programs using subsystems. A subsystem is an operating system component that implements an operating system's application program interfaces ("APIs"). Subsystems may invoke functions of a kernel component. A kernel component is an operating system component that provides core operating system functions.

An operating system may comprise multiple subsystems, each exposing different operating system behaviors. As an example, an operating system may implement a portable operating system interface ("POSIX") and a MICROSOFT WINDOWS interface as two separate subsystems. These subsystems may both function on a common operating system. Such an operating system may function both with applications designed for POSIX and applications designed for MICROSOFT WINDOWS.

When an application or other software component executes, it may encounter various abnormal conditions. These abnormal conditions may include, e.g., running out of memory, failing to find a file, causing a floating point error of a processor, receiving an illegal instruction, referencing an un-allocated memory page, etc. These abnormal conditions are generally outside the software component's control. When such an abnormal condition is encountered, the operating system may generate an "exception."

Various software components, including the application program, may have program logic to detect and handle exceptions. As an example, an application may attempt to locate a file when a file cannot be found. As another example, a subsystem may indicate to a user to close applications when memory cannot be allocated to an application requiring additional memory.

Exceptions may also be handled by a debugger. A debugger is a computer program that a software developer may use to debug a software component, e.g., to detect problems in the software component's program logic. As an example, a software developer or system administrator may cause a debugger to automatically attach to a process when an exception is generated by a thread of the process and handle the exception. Handling the exception in a debugger may include suspending execution of the thread in which the exception occurred so that the software developer or system administrator may diagnose the cause of the exception.

An application may use some software components hosted by one subsystem and other software components hosted by another subsystem. Even though an application uses components of both subsystems, the application may operate in a process relating to one of the subsystems. In such a case, exceptions may be provided to the subsystem with which the process is related. As an example, a POSIX application may use component A that is hosted by WINDOWS and component B that is hosted by POSIX. A component is hosted by a subsystem for which the component was built. When the component is built, the component includes an indication of the subsystem for which it is designed. When the component hosted by POSIX causes an exception, the operating system may nevertheless send the exception to the WINDOWS subsystem because the application and the POSIX subsystems may be running as WINDOWS processes. However, the component hosted by POSIX may have program logic designed to handle the exception. Because the operating system is unaware of the program logic, the exception may not be properly handled, and threads and processes of the application may be terminated by the operating system. It would thus be highly desirable to route exceptions between subsystems.

DETAILED DESCRIPTION

Techniques for routing exceptions to operating system subsystems are provided. In various embodiments, a software developer may add a global exception handler ("GEH") software component to an application. The GEH may be added to an application that utilizes components from multiple subsystems. As an example, the application may utilize WINDOWS and POSIX dynamic link libraries ("DLLs"). When the application starts, it may load and register the GEH. The GEH may then determine to which subsystem exceptions should be routed. As an example, the GEH may determine that exceptions should be routed to the subsystem associated with the application. Alternatively, the application may specify to the GEH a subsystem to which exceptions should be routed. Then, when a software component generates an exception in the process with which the application is associated, the exception may be provided to the GEH. The GEH may then route the exception to the subsystem that it previously determined should receive exceptions. If the operating system or application is configured to be debugged, the exceptions may be provided to the debugger. When the operating system or application is no longer configured to be debugged, the GEH may again begin receiving exceptions.

The GEH may route exceptions by sending a local procedure call ("LPC") message to the other subsystem. The GEH may make the LPC message appear to be an exception. Then, when the other subsystem receives the LPC message, it behaves as if it had received the exception from the operating system. Thus the other subsystem, or a component associated with the other subsystem, may handle the exception. By routing exceptions to operating system subsystems, applications may behave as intended by a software developer, and debugging is enabled when the software developer develops applications using components associated with multiple subsystems.

Figure 1:
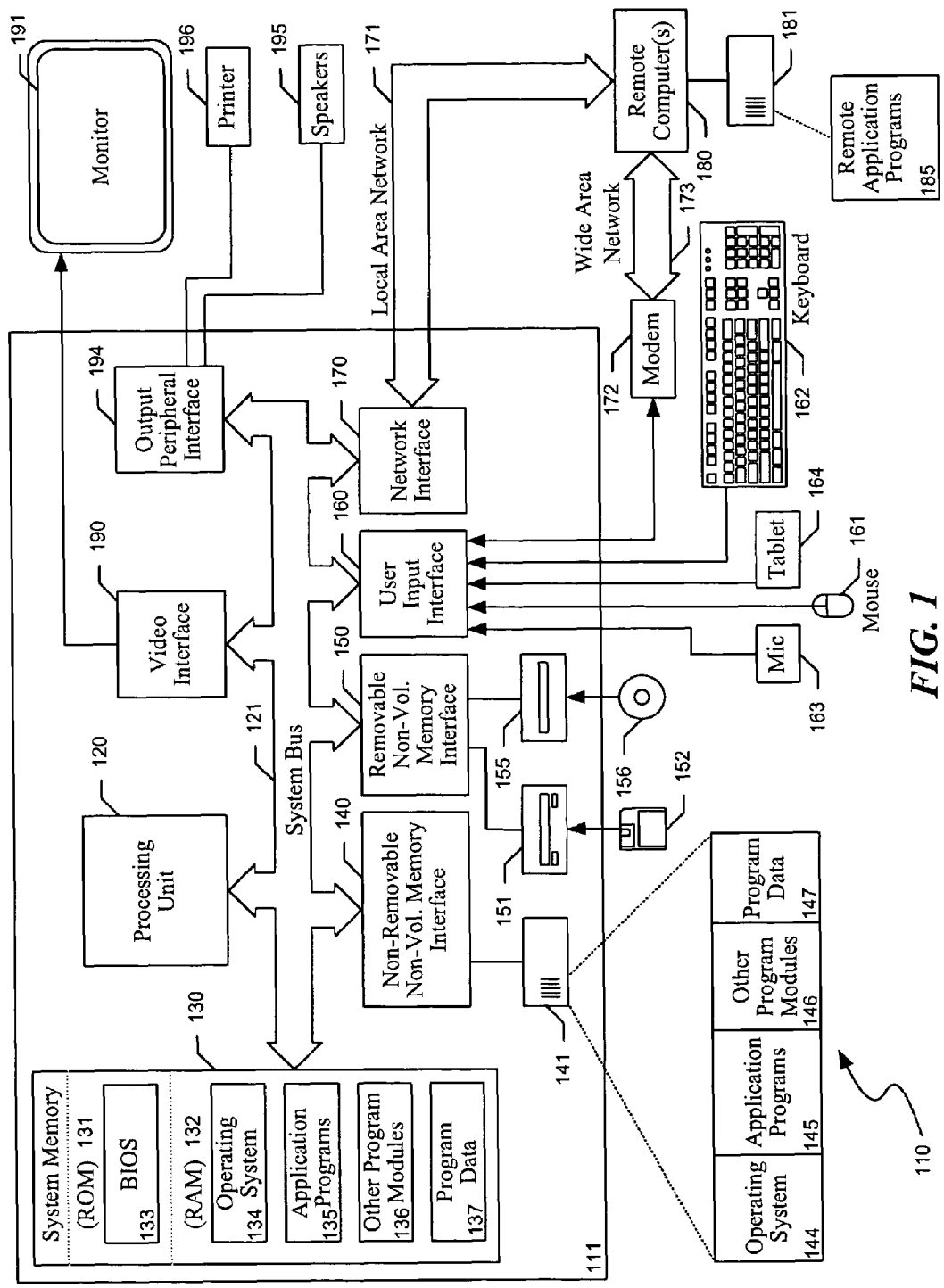
FIG. 1 is a block diagram illustrating an example of a suitable computing environment in which the techniques may be implemented.

Turning now to the figures, FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
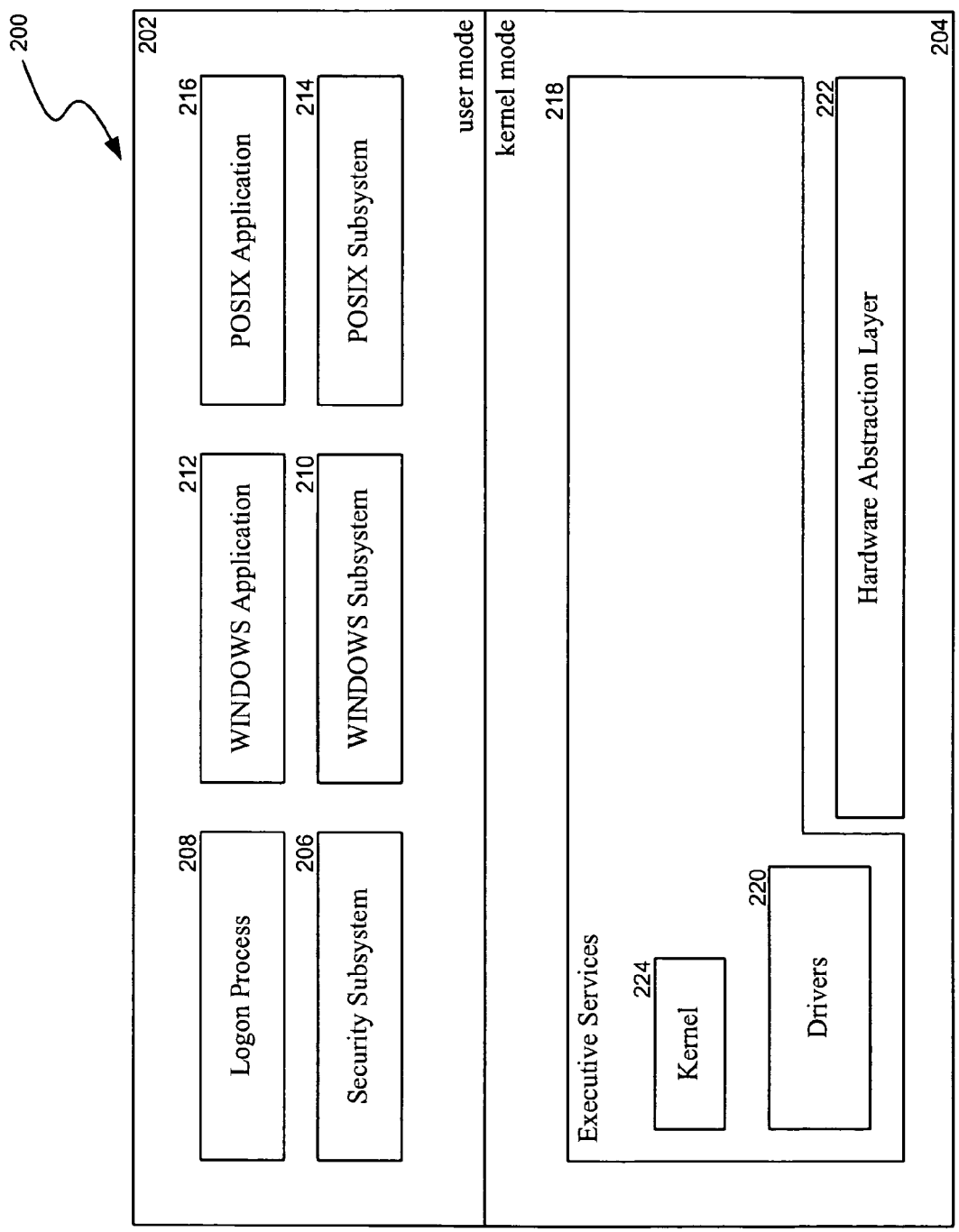
FIG. 2 is a block diagram illustrating components of an operating system.

FIG. 2 is a block diagram illustrating components of an operating system. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to applications and the operating system. As an example, the security subsystem may provide a logon process 208 and functionality to enable users to log on to the operating system.

The WINDOWS subsystem may provide MICROSOFT WINDOWS functionality to applications, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

When an operating system comprises multiple subsystems, it is capable of providing multiple varieties of operating systems, such as MICROSOFT WINDOWS and POSIX. Thus, applications designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Generally, exceptions are handled by the last component that registers to handle exceptions. As an example, if an application does not register to handle exceptions, the subsystem associated with the application may handle the exceptions. When an application registers to handle exceptions, the subsystem may provide the unhandled exceptions to the application. When a debugger is used to debug the application, the debugger may register to handle exceptions. In such an event, the exceptions may be provided to the debugger. The technique utilizes this architecture to route exceptions to subsystems.

In various embodiments, the POSIX subsystem 214, POSIX application, and the GEH may all operate as a WINDOWS process. As an example, when an application is capable of utilizing resources (e.g., DLLs) from both processes, the application may be said to operate in a "mixed mode." When the application operates in mixed mode, the application's threads and process space may operate in the context of one of the subsystems, such as WINDOWS. As a result, when an exception is generated, the exception may be routed to the WINDOWS subsystem. However, the POSIX Application may have program logic designed to handle exceptions. Thus, it may be desirable to route exceptions to the POSIX subsystem.

Although applications are shown as a part of the operating system, they may execute by utilizing various facilities provided by the operating system, as illustrated in FIG. 1.

Figure 3:
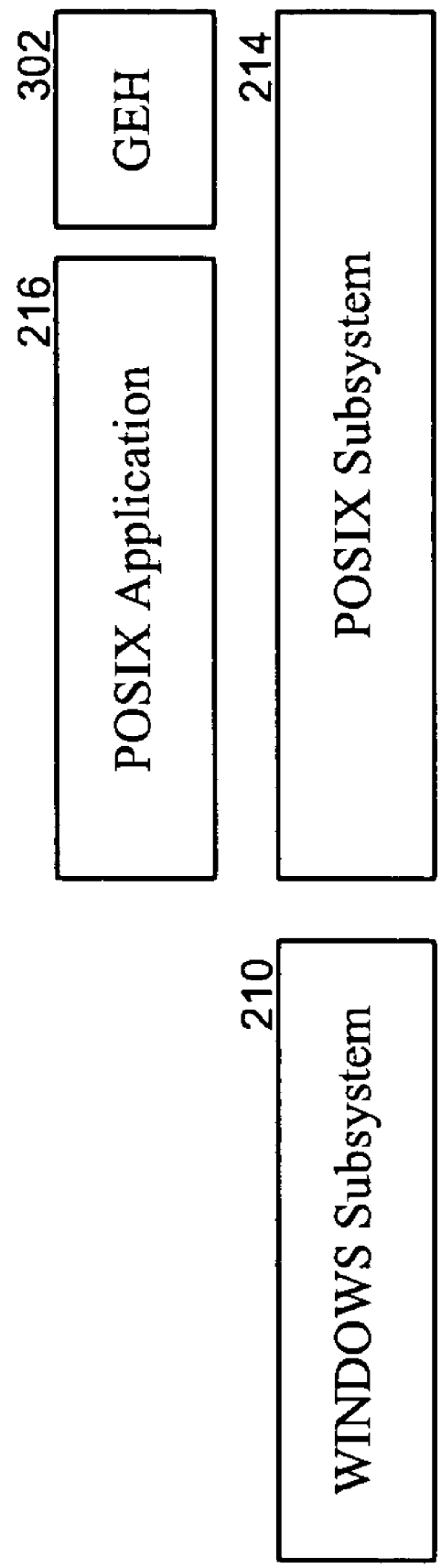
FIG. 3 is a block diagram illustrating components of an operating system having a global exception handler in an embodiment.

FIG. 3 is a block diagram illustrating components of an operating system having a global exception handler in an embodiment. In the illustrated embodiment, the operating system illustrated in FIG. 2 additionally comprises a global exception handler software component ("GEH") 302.

The GEH may be loaded by a POSIX Application 216 to route exceptions. As an example, the GEH may be a DLL that the application loads dynamically. Alternatively, the GEH may be a statically linked library that the application may link. When the application loads the GEH, it may provide an indication to the GEH to route exceptions to the POSIX subsystem. Alternatively, the GEH may detect that the application is associated with the POSIX subsystem, e.g., because the application links with a POSIX library.

Because the GEH may be the last component to register to handle exceptions, and the GEH operates in a WINDOWS process space, exceptions that would generally be handled by the WINDOWS subsystem may be provided to the GEH.

The GEH may then provide the exception to the POSIX subsystem in a local procedure call. The GEH may create an LPC message comprising the exception and send the message to the POSIX subsystem by making an LPC to a known port of the subsystem that generally receives exceptions. In various embodiments, the subsystem may not receive an indication that the exception was routed by another subsystem that previously received the exception. Thus, although the WINDOWS subsystem received an exception, it is routed to the POSIX subsystem.

The POSIX subsystem may handle the exception. Alternatively, the POSIX subsystem may provide the exception to the POSIX application.

Figure 4:
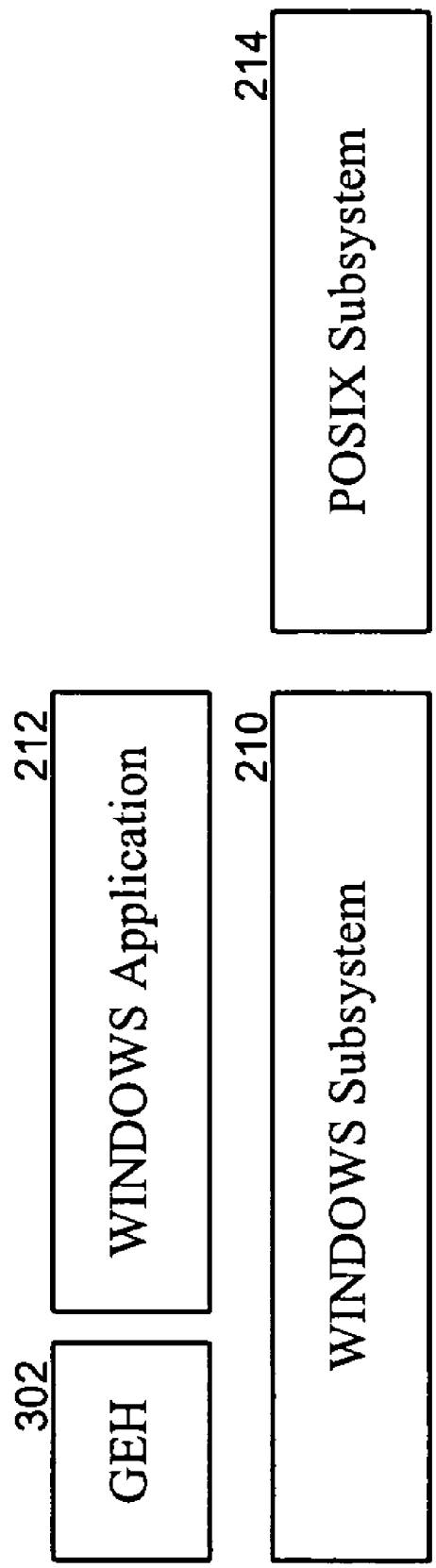
FIG. 4 is a block diagram illustrating components of an operating system having a global exception handler in an embodiment.

FIG. 4 is a block diagram illustrating components of an operating system having a global exception handler in an embodiment. In the illustrated embodiment, the GEH may be associated with a WINDOWS application. This configuration may be used, e.g., when the mixed mode application operates in a POSIX process space. In this case, the POSIX subsystem may route the exception to the WINDOWS subsystem.

Figure 5:
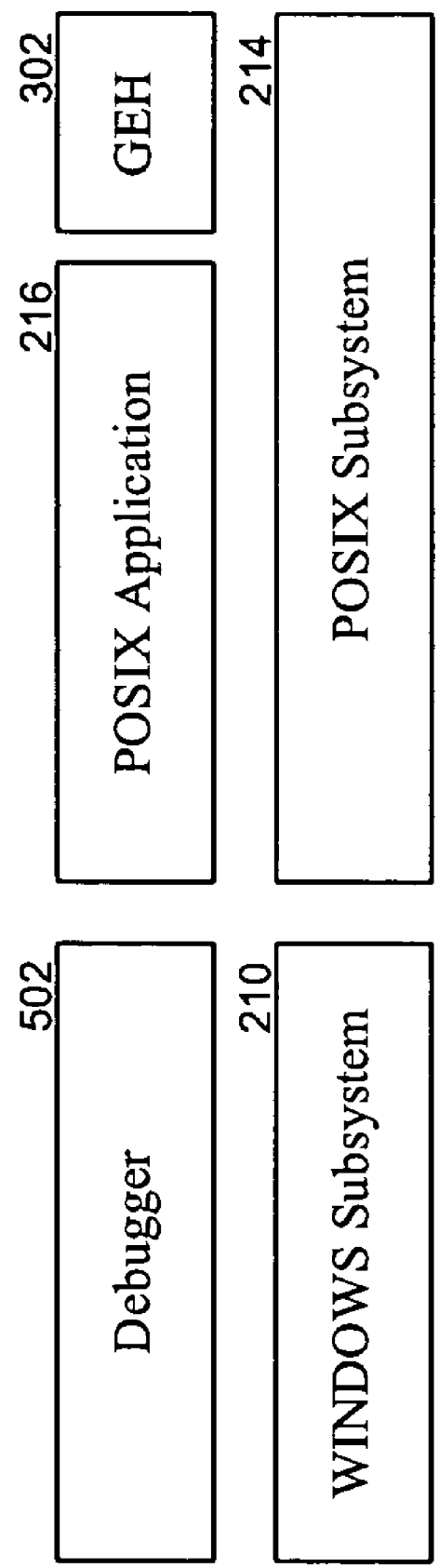
FIG. 5 is a block diagram illustrating components of an operating system having a global exception handler and a debugger in an embodiment.

FIG. 5 is a block diagram illustrating components of an operating system having a global exception handler and a debugger in an embodiment. The components may operate in a manner similar to that described above in relation to FIG. 3. That is to say that the components are associated with the WINDOWS subsystem and may be running in a WINDOWS process space.

The illustrated embodiment also has a debugger component 502. The debugger may be a standard debugger, such as one provided by MICROSOFT CORPORATION. The debugger may be used by a software developer to debug operating system components, such as applications. When a debugger is used, it may request to handle exceptions, such as by registering with the WINDOWS and/or POSIX subsystem an indication that the debugger is attached to a process. When an exception occurs while a component is debugged, the exception may be provided to the debugger. The software developer may indicate to the debugger to continue executing the application. When this happens, the debugger may detach from the process and deregister itself. When it does so, the exception may be redirected to the WINDOWS subsystem, which may then provide it to the GEH. The GEH may then route the exception to the POSIX subsystem. The subsystems with which the debugger is registered may then notify the debugger that it can reattach to the process. The subsystems may provide the notification to a debugger extension DLL. The debugger may then reattach so that further exceptions are routed to it. Thus, when the GEH is used, exceptions may be routed to an appropriate subsystem even when an application is being debugged.

Figure 6:
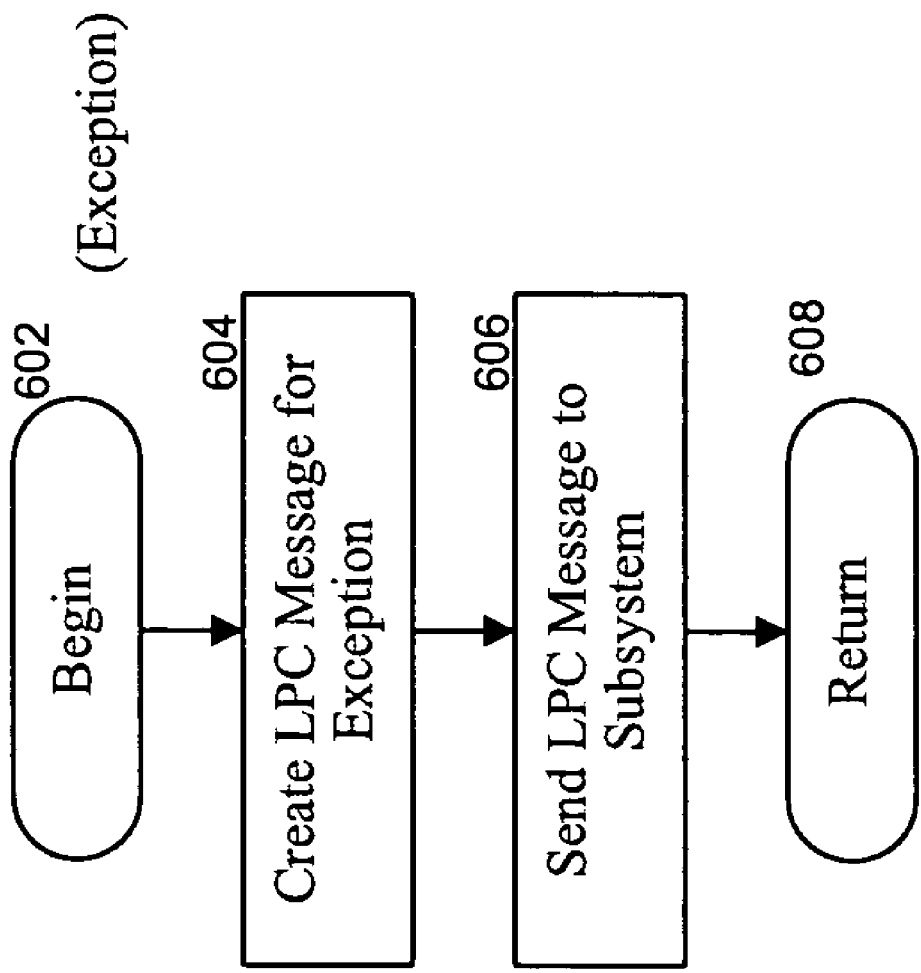
FIG. 6 is a flow diagram illustrating a routine for routing exceptions in an embodiment.

FIG. 6 is a flow diagram illustrating a routine for routing exceptions in an embodiment. The routine may be performed by the GEH when it receives an exception.

The routine begins at block 602 where it receives an indication of an exception as a parameter. The exception may have been received by a subsystem associated with the GEH. As an example, the exception may have been received by the WINDOWS subsystem when the GEH is operating within a WINDOWS process space.

At block 604, the routine creates an LPC message. The LPC message may be created in such a manner that a subsystem that receives the exception may be unable to determine that the exception was previously received by another subsystem. In various embodiments, the LPC message may be created to indicate that the exception was previously received by another subsystem.

At block 606, the routine sends the LPC message to another subsystem. As an example, the routine may send the LPC message to the POSIX subsystem. The routine may send the message to a known port of the subsystem. As an example, the routine may send the message to a port that generally receives exceptions from the operating system.

At block 608, the routine returns to its caller.

By sending an LPC message to a subsystem, the routine is able to route the exception to the subsystem. In various embodiments, other techniques can be used by the GEH to route exceptions to a subsystem. As an example, the GEH may use any of a variety of communications means employed by operating systems that enable software components to communicate with one another.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for routing exceptions to a subsystem of an operating system, comprising:
   a processor and memory;
   a first subsystem of the operating system, the first subsystem having an associated process, the associated process having a process space;
   a software component that generates an exception, the software component operating in the process space; and
   a global exception handler, the global exception handler registered by the associated process for handling exceptions in the process space of the first subsystem by receiving the exception and routing the received exception to a second subsystem of the operating system, wherein the first subsystem of the operating system provides a WINDOWS interface and the second subsystem complies with a portable operating system interface specification.

2. The system of claim 1 wherein the software component is a library for providing a function to the software component operating in the process space.

3. The system of claim 1 wherein the software component that generates the exception is the associated process.

4. The system of claim 1 wherein the software component that generates the exception is an operating system component.

5. The system of claim 1 wherein the global exception handler is a dynamic link library.

6. The system of claim 1 wherein the global exception handler can be registered by multiple software components.

7. The system of claim 1 wherein the routing includes sending a local procedure call message from the first subsystem to the second subsystem.

8. The system of claim 7 wherein the message conveys the exception to the second subsystem.

9. The system of claim 1 wherein a debugger handles the exception.

10. A method performed by a computer system having a processor for routing exceptions to a subsystem of an operating system, comprising:
receiving by the processor a request to register for handling exceptions, the registration request sent by an application associated with a second subsystem of the operating system and that operates in a process space associated with the second subsystem of the operating system;
registering to handle exceptions, the registering based upon the received request; and
when an exception is received, the exception caused by a software component associated with a first subsystem of the operating system,
routing by a global exception handler the received exception to the second subsystem of the operating system, wherein the global exception handler is (a) a dynamic link library associated with a process started by the second subsystem of the operating system and (b) configured to receive exception and route the received exception, wherein the first subsystem of the operating system provides a WINDOWS interface and the second subsystem of the operating system complies with a portable operating system interface specification.

11. The method of claim 10 wherein a message that is routed to the second subsystem of the operating system conveys the exception.

12. The method of claim 10 wherein a debugger handles the exception.

13. The method of claim 10 wherein the registering includes indicating, a particular subsystem to which exceptions should be routed.

14. The method of claim 13 wherein the particular subsystem is indicated by, the application, sending the request to register for handling exceptions.

15. A computer-readable storage medium storing computer-executable instructions for performing a method for routing exceptions to a subsystem of an operating system, the method comprising:
receiving a request to register for handling exceptions, the registration request sent by, an application associated with a second subsystem of the operating system, wherein the second subsystem of the operating system provides a WINDOWS interface, the application associated with a process, the associated process having a process space;
registering to handle exceptions;
receiving an exception the exception caused by a software component of the operating system associated with, a first subsystem of the operating system, wherein the first subsystem of the operating system complies with a portable operating system interface specification; and
routing the received exception to the second subsystem of the operating system.

* * * * *

UNITED STATES PATENT AND TRADEMARK OFFICE
CERTIFICATE OF CORRECTION

PATENT NO. : 7,577,962 B2  Page 1 of 1
APPLICATION NO. : 11/004585
DATED : August 18, 2009
INVENTOR(S) : Bendapudi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Seventh Day of September, 2010

David J. Kappos
*Director of the United States Patent and Trademark Office*